(12) United States Patent
Bosman et al.

(10) Patent No.: US 11,312,596 B2
(45) Date of Patent: Apr. 26, 2022

(54) ENDLESS SHAPED ARTICLE

(71) Applicant: DSM IP ASSETS B.V., Heerlen (NL)

(72) Inventors: Rigobert Bosman, Echt (NL); Dietrich Wienke, Echt (NL); Johanna Gertruda Kersjes, Echt (NL); Jozef Siegfried Johannes Homminga, Echt (NL); Roelof Marissen, Echt (NL); Christiaan Henri Peter Dirks, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 420 days.

(21) Appl. No.: 14/405,990

(22) PCT Filed: Jun. 11, 2013

(86) PCT No.: PCT/EP2013/062015
§ 371 (c)(1),
(2) Date: Dec. 5, 2014

(87) PCT Pub. No.: WO2013/186206
PCT Pub. Date: Dec. 19, 2013

(65) Prior Publication Data
US 2015/0147509 A1 May 28, 2015

(30) Foreign Application Priority Data

Jun. 11, 2012 (EP) .................................... 12171543

(51) Int. Cl.
*B66C 1/18* (2006.01)
*D07B 1/02* (2006.01)
(Continued)

(52) U.S. Cl.
CPC ................ *B66C 1/18* (2013.01); *D07B 1/025* (2013.01); *D07B 7/165* (2013.01); *B65G 15/30* (2013.01);
(Continued)

(58) Field of Classification Search
CPC .. B66C 1/18; D07B 1/025; D07B 5/04; D07B 7/165; D07B 5/12; D07B 2201/2003; D07B 2201/2016; D07B 2201/2014
See application file for complete search history.

(56) References Cited

U.S. PATENT DOCUMENTS 2,771,315 A * 11/1956 Fenwick ................... B66C 1/18
294/74
3,280,995 A 10/1966 Barkley
(Continued)

FOREIGN PATENT DOCUMENTS

DE 20 2009 007416 8/2009
EP 0 150 550 8/1985
(Continued)

OTHER PUBLICATIONS

Rieter, "Twist and Strength" available online at http://www.rieter.com/en/rikipedia/articles/technology-ofshort-staple-spinning/yarn-formation/imparting-strength/true-twist-with-reference-to-ring-spun-yarn/twist-and-strength/. Web archive capture date Nov. 6, 2010.*
(Continued)

*Primary Examiner* — Michael M Dollinger
*Assistant Examiner* — Christina H. W. Rosebach
(74) *Attorney, Agent, or Firm* — Nixon & Vanderhye P.C.

(57) ABSTRACT

The invention relates to an endless shaped article comprising at least one strip of material forming a plurality of convolutions of the strip of material, the strip having a longitudinal axis, wherein each convolution of said strip comprises a twist along the longitudinal axis of said strip, wherein said twist is an odd multiple of 180 degrees. The invention also relates to a method to manufacture said article, and its use as sling, loop, belt or chain link.

26 Claims, 2 Drawing Sheets

(51) Int. Cl.
    *D07B 7/16*     (2006.01)
    *D07B 5/12*     (2006.01)
    *B65G 15/30*    (2006.01)

(52) U.S. Cl.
    CPC ........ *D07B 5/12* (2013.01); *D07B 2201/2003* (2013.01); *D07B 2201/2016* (2013.01); *D07B 2205/2014* (2013.01)

(56) References Cited

U.S. PATENT DOCUMENTS

| | | | |
|---|---|---|---|
| 3,290,083 A | | 12/1966 | Norton |
| 3,368,837 A | * | 2/1968 | Norton .................. B66C 1/18 294/74 |
| 3,466,080 A | * | 9/1969 | Norton .................. B66C 1/18 294/74 |
| 3,899,206 A | * | 8/1975 | Miura .................. B66C 1/18 294/74 |
| 3,995,506 A | * | 12/1976 | Poe |
| 4,022,507 A | * | 5/1977 | Marino .................. B66C 1/18 294/150 |
| 4,052,095 A | * | 10/1977 | Johnson .................. B66C 1/18 294/74 |
| 4,413,110 A | | 11/1983 | Kavesh et al. |
| 4,457,985 A | * | 7/1984 | Harpell .................. A42B 3/062 442/301 |
| 4,779,411 A | | 10/1988 | Kendall |
| 5,091,133 A | | 2/1992 | Kobayashi et al. |
| 5,330,240 A | | 7/1994 | Barra |
| 2009/0067896 A1 | * | 3/2009 | Katayama ............. B65H 5/021 399/313 |
| 2010/0327615 A1 | * | 12/2010 | Juan Ponsa ............. B66C 1/18 294/74 |
| 2011/0058449 A1 | * | 3/2011 | Stenzel .................. G01V 1/201 367/20 |
| 2011/0091682 A1 | * | 4/2011 | Holland .................. B32B 5/26 428/100 |
| 2012/0168285 A1 | * | 7/2012 | Holland et al. |

FOREIGN PATENT DOCUMENTS

| | | | |
|---|---|---|---|
| EP | 0 200 547 | 11/1986 | |
| EP | 0 205 960 | 12/1986 | |
| EP | 0 213 208 | 3/1987 | |
| EP | 0 247 869 | 12/1987 | |
| EP | 0 269 151 | 6/1988 | |
| EP | 0 472 114 | 2/1992 | |
| EP | 0 504 954 | 9/1992 | |
| EP | 0 508 889 | 1/1995 | |
| EP | 1 699 954 | 9/2006 | |
| GB | 1 480 305 | 7/1977 | |
| GB | 2 042 414 | 9/1980 | |
| GB | 2 051 667 | 1/1981 | |
| GB | 2 373 777 | 10/2002 | |
| GB | 2373777 A * | 10/2002 | ............ B65G 15/30 |
| JP | 52-69774 | 11/1950 | |
| JP | 53-61976 | 10/1951 | |
| JP | 54-83769 | 11/1952 | |
| JP | 54083769 | 7/1979 | |
| JP | 11-43280 | 2/1999 | |
| WO | WO 01/73173 | 10/2001 | |

OTHER PUBLICATIONS

"Flat Belts" by Machine Design. Nov. 2002. Accessed at https://www.machinedesign.com/basics-design/flat-belts. (Year: 2002).*
International Search Report for PCT/EP2013/062015 dated Jul. 11, 2013.
T. Nakajima et al., "Advanced Fibre Spinning Technology", Woodhead Publ. Ltd., 1994, 21 pages.
MX Application No. MX/a/2014/014922, *4th Substantive Examination Office Action is Notified*, Office Action No. 87479, dated Dec. 20, 2019 (English Translation).

* cited by examiner

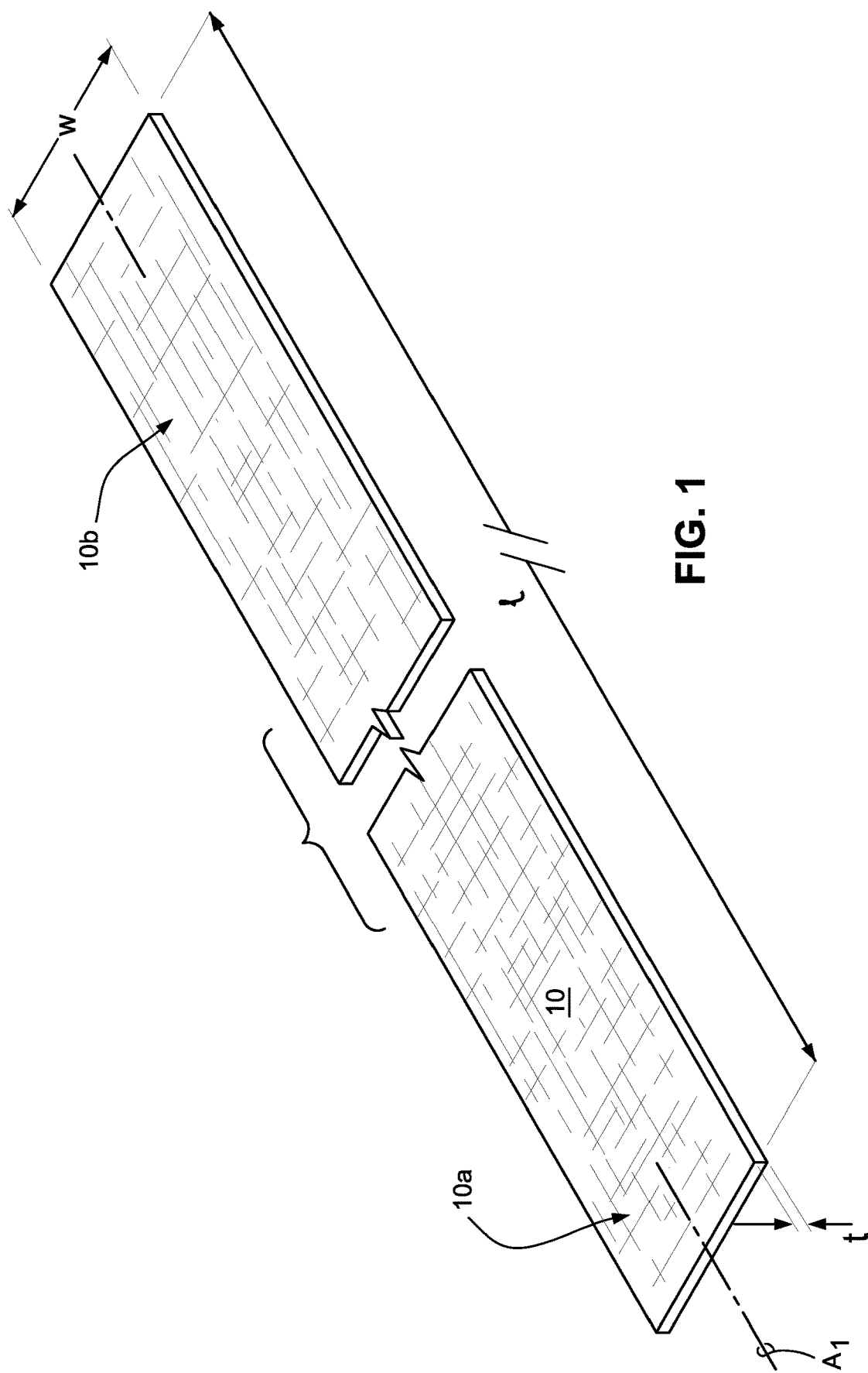

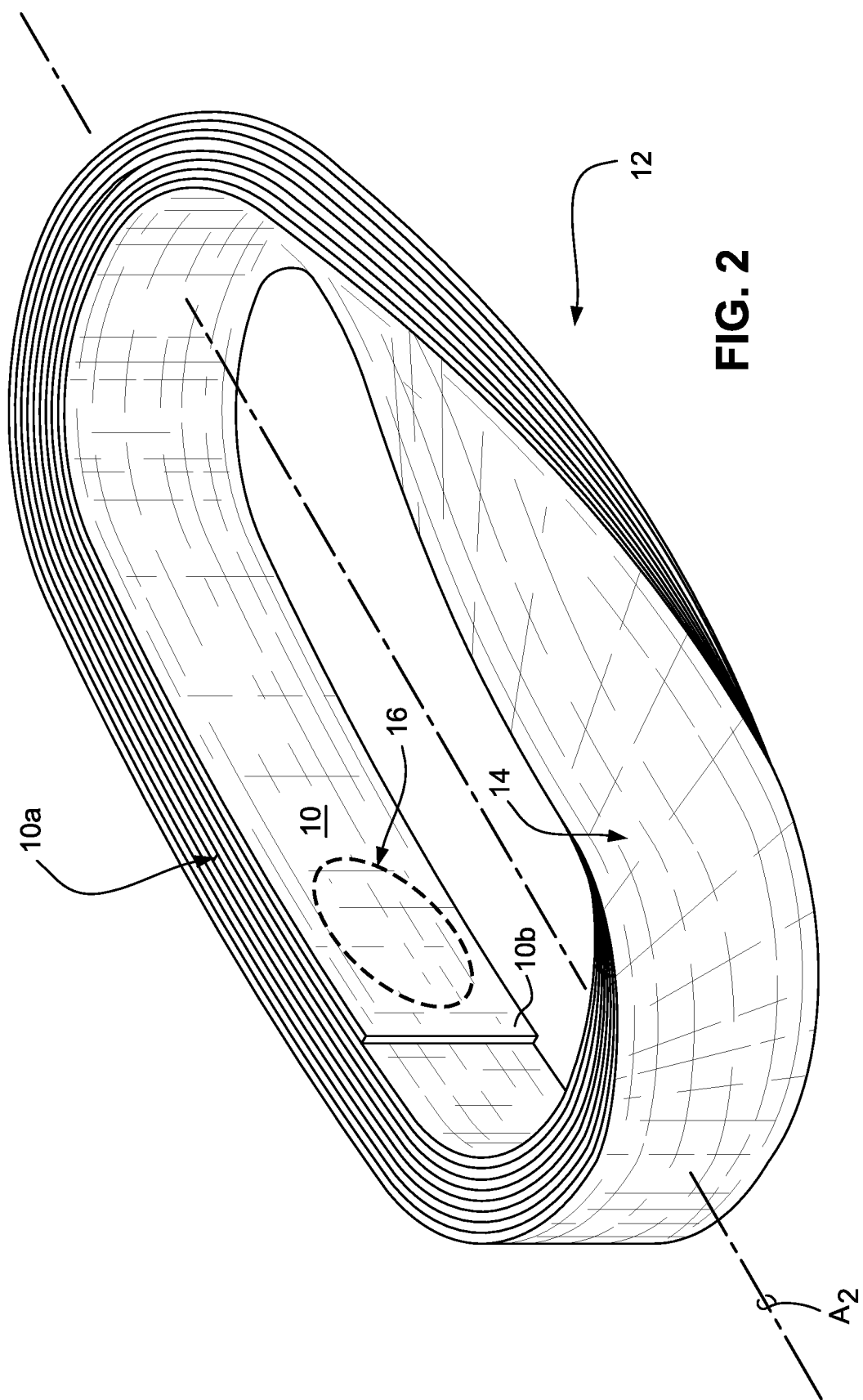

US 11,312,596 B2

ENDLESS SHAPED ARTICLE

CROSS-REFERENCE TO RELATED APPLICATIONS

This application is the U.S. national phase of International Application No. PCT/EP2013/062015 filed 11 Jun. 2013 which designated the U.S. and claims priority to European Patent Application No. 12171543.7 filed 11 Jun. 2012, the entire contents of each of which are hereby incorporated by reference.

FIELD

The invention relates to an endless shaped article comprising a plurality of convolutions of a strip of material. The invention further relates to the use of the endless shaped article.

BACKGROUND AND SUMMARY

An example of an endless shaped article is disclosed for instance in EP0150550. EP0150550 discloses a suspension strap having a looped core comprising a woven cloth band, said band being coiled in a large number of convolutions, also called layers.

Although the endless shaped article according to EP0150550 shows a good load carrying strength/capacity, it was observed that the current endless shaped articles may have a reduced capability to distribute loads uniformly on the individual layers of the convoluted strip of material. Hence, certain layers may be subjected to excessively high loads when the endless shaped article is subjected to a load. These layers may represent the weakest spots in the endless shaped article. In case of failure of said weakest layers, the load will be distributed over the remaining layers and may result in a premature failure of the endless shaped article.

Moreover, it was observed that the efficiency of the known endless shaped articles, i.e. the ratio between the measured strength of the endless shaped article and the theoretical strength calculated by multiplying the twice the number of convolutions of the strip of material with its strength, may be reduced.

Different solutions were proposed to alleviate the above mentioned drawbacks as for example disclosed in EP0150550 and EP0247869. However, the problem of unequal load distribution on the individual layers of the convoluted strip of material is still present and may negatively affect the efficiency of the endless shaped articles.

The aim of the invention may therefore be to provide an endless shaped article which does not show the above mentioned drawbacks, or it shows them to a lesser extent. In particular, the aim of the invention is to provide an endless shaped article having an improved efficiency when compared to known endless shaped articles. It is also an aim of the invention to provide an endless shaped article that is more versatile in that it can be used for diverse applications without the need of redesigning it for each new application. It is also an aim of the invention to provide an endless shaped article which has a higher safety factor, i.e. is less prone to fail or break when subjected to high loads.

The invention therefore provides an endless shaped article comprising at least one strip of material forming a plurality of convolutions of the strip of material, the strip having a longitudinal axis, characterized in that each convolution of said strip comprises a twist along the longitudinal axis of said strip, wherein said twist is an odd multiple of 180 degrees.

By a convolution of the strip is herein understood a loop thereof, also called a winding or a coiling, i.e. a length of said strip starting at an arbitrary plane perpendicular to the longitudinal axis of the strip and ending in an endless fashion at the same plane, thereby defining a loop of said strip.

It was observed that the endless shaped article of the invention when used in different load bearing applications, e.g. as an element of a synthetic chain or as a lifting sling, it has an increased efficiency when compared to commonly used endless shaped articles.

It was further observed that the endless shaped article of the invention allows a broader diversity of strips of material to be coiled to the endless shaped article, whereas endless shaped articles commonly used have designs specifically adapted to the employed strips of materials.

BRIEF DESCRIPTION OF THE DRAWINGS

FIG. 1 is a perspective view of a fabric strip that may be formed into a link in accordance with an embodiment of the invention; and FIG. 2 is a perspective view of an endless shaped article (chain element) formed of several convolutions of the strip as depicted in FIG. 1.

DETAILED DESCRIPTION

Endless shaped articles are generally known and include for example slings, loops, belts and chain links. In many occasions endless shaped articles are used as connecting elements. For example it is possible to use a ring as a connecting element for two or more rope ends, by attaching the rope ends to the ring. In case of a loop or a roundsling it is for example possible to make a connection between two objects by attaching the loop or the roundsling to both objects, for example by knotting or by winding the loop around the object. Accordingly, one embodiment of the invention is the use of the endless shaped article of the invention as a chain element, a sling or a belt.

By strip is herein meant a flexible elongated body having a thickness (t) and a width (w), wherein thickness (t) is much smaller than width (w). An exemplary strip 10 having a thickness (t) much smaller than the width (w) and an indefinite length (I) is shown in FIG. 1. Preferably the strip 10 has a width to thickness ratio of at least 5:1, more preferably at least 10:1, the width to thickness ratio preferably being at most 200:1, and even more preferably at most 50:1. Sometimes a strip 10 may as well be called a band or a flat band. Examples of a strip 10 may be a tape, a film or a strap. A strap is readily made for example by weaving, plaiting or knitting yarns into any construction known in the art, e.g. a plain and/or twill weave construction for instance. The preferably has an n-ply textile webbing construction where n is preferably at most 4, more preferably 3 and most preferably 2. Such webbing construction has the advantage that it provides the endless shaped article with increased flexibility. In the context of the present invention, the term "plurality of convolutions" may also be understood as "coiled into a plurality of overlapping layers". Said overlapping layers of the strip are preferably substantially superimposed upon one another but may also present a lateral offset. The convolutions may be in direct contact to each other but may also be separated. Separation between the convolutions may for example be by a further strip of material, an adhesive layer or a coating.

In a preferred embodiment, the endless shaped article 12 in the form of a chain element as shown in FIG. 2 comprises at least 2 convolutions of the strip 10 of fabric material, preferably at least 3, more preferably at least 4, most preferably at least 8 convolutions. With increasing number of convolutions, the endless shaped article 12 according to the invention has optimized efficiency. The maximum number of convolutions is not specifically limited. For practical reasons 1000 convolutions may be considered as an upper limit.

The thickness (t) and width (w) of the strip 10 are not particularly limited. It will be obvious to the skilled person that thickness (t), width (w) of the strip 10 and the number of convolutions of said strip 10 may strongly influence the width and thickness of the endless shaped article 12. Thickness (t) of the strip 10 will strongly depend upon the nature of the strip 10 and its material. A typically range of thickness (t) may be between 10 micron and 10 mm, more preferably between 20 micron and 5 mm. The width (w) of the strip 10 of material will strongly depend upon the desired dimensions of the endless shaped article.

The length of the convolutions of the convoluted strip 10 of material may vary broadly. Such length may strongly depend on the trajectory described by the strip 10 of material and the tightness towards the adjacent convolutions of the strip 10 of material. Preferably the difference in length between two adjacent convolutions of the strip 10 of material is less than 6 times the thickness (t) of the strip 10, preferably less than 4 times the thickness (t) of the strip 10, most preferably less than 2 times the thickness (t) of the strip 10. The advantage hereof is that the efficiency of the endless shaped article 12 may be further improved.

In a yet preferred embodiment, the lengths of each convolution differs from the average length of all convolutions by less than 6 times, preferably less than 4 times, most preferably less than 2 times the thickness of the strip 10. By average length of all convolutions is understood the sum of all individual length of the convolutions divided by the number of convolutions of the strip 10. Most preferably all convolutions of the strip 10 of material are of substantially the same length. It was found that by reducing the difference between lengths of convolutions from the average length of convolution the efficiency of the endless shaped article could yet be further improved.

Each convolution of the strip 10 of material may tightly superimpose adjacent convolutions of the strip of material, forming an endless shaped article 12 as shown in FIG. 2 with increased density. In a preferred embodiment, the density of the endless shaped article 12 is at least 70% of the maximum obtainable density, more preferably at least 80%, even more preferably at least 90%, even more preferably at least 95%, most preferred at least 99% of the maximum obtainable density. An increase in said density can be achieved by adjusting the various lengths of the convolutions contained by the inventive article, e.g. as detailed immediately hereinbefore. The maximum obtainable density is herein understood the density of the strip used to produce the endless shaped article 12, or is the inventive article contains further materials in addition to the strip, the density calculated from fractions and densities of the further materials and that of the strip 10.

As shown in FIG. 2, according to the invention, each convolution of the strip 10 of material comprises a twist 14 of an odd multiple of 180 degrees along its longitudinal axis A1 (see FIG. 1), preferably the odd multiple is one. Said twist 14 of an odd multiple of 180 degrees will result in an endless shaped article 12 comprising a twist of an odd multiple of 180 degrees along its longitudinal axis A2 (see FIG. 2). The presence of said twist 14 in each convolution of the strip 10 of material results in an endless shaped article 12 with a single outer surface. Another characteristic of said construction is that the lateral surfaces of a first end 10a of the strip of material is superimposed on either side by the convoluted strip 10 of material. It was observed that said twist 14 results in a construction such that the convolutions lock themselves against relative shifting.

Preferably, at least 2 convolutions of the strip 10 of material are connected to each other by at least one fastening element. Although the construction inherently prevents dislocation of the individual convolutions of the strip of material, it was observed that use of a fastening element further improves the stability of the endless shaped article. Examples of fastening elements in the context of the present invention are stitching, glue, knotting, bolt, heat sealing, rivets or the like.

In a yet preferred embodiment, the two ends 10a, 10b of the strip 10 of material are connected by at least one fastening element such as stitching in the region 16 shown schematically in FIG. 2. Such a construction may for example be achieved by adjustment of the lengths of the strip 10 of material such that the two ends 10a, 10b of the strip 10 overlap and applying a stitching in the region 16 through the endless shaped article 12 at said overlapping position of the two ends 10a, 10b. It was observed that a construction according to this embodiment resulted in an optimized efficiency of the endless shaped article 12. In a yet more preferred construction of this embodiment, the one end 10a of the strip reaches the other end 10b through an opening (not shown) across the convolutions of the endless shaped article. It was observed that such a construction can easily be achieved with a strip of material providing gaps, as may be introduced for example in the form of perforations, eyes, slits or splices, occurring at equidistant intervals along the longitudinal axis of the strip. Such a strip of material in its convoluted form may result in overlapping of said gaps throughout the convoluted strip of material, providing an endless shaped article with one or more openings suitable for applying fastening means. Such endless shaped article with one or more gaps through the convoluted strip represents a further embodiment of the invention.

Optionally, the endless shaped article may also be sheathed with a protective cover having any construction known in the art and manufactured from multifilament yarns as detailed above. Such a sheet is known for example from U.S. Pat. No. 4,779,411. If a protective covered is used, its thickness is not to be taken into account when determining the thickness of the endless shaped article and its leg weight.

A strip 10 of material may be suitably constructed from tapes, films, yarn, metallic fibre cables, natural and/or synthetic fibres, textile cloth or a combination thereof. Therefore the endless shaped article may comprise tapes films, yarns, metallic fibre cables, natural and/or synthetic fibres, textile cloth or a combination thereof.

In a preferred embodiment, the strip 10 of material comprises a synthetic polymer. Preferably the synthetic polymer is a polyolefin, preferably an ultrahigh molecular weight polyolefin, most preferably an ultrahigh molecular weight polyethylene. This has the advantage that the endless shaped article has a high strength and a good corrosion resistance.

In one preferred embodiment of the invention, the strip 10 of material is a tape.

In the context of the present invention, the tape comprises a polymer, whereby the polymer is preferably a thermoplastic polymer that is selected from the group consisting of polyolefins e.g. polyethylene, polyesters, polyvinyl alcohols, polyacrylonitriles, polyamides or polyketone. Suitable polyamides are, for example, the aliphatic polyamides PA-6, PA-6,6, PA-9, PA-11, PA-4,6, PA-4,10 and copolyamides thereof and semi-aromatic polyamides based on for example PA-6 or PA-6,6 and aromatic dicarboxylic acids and aliphatic diamines, for example isophthalic acid and terephthalic acid and hexanediamine, for example PA-4T, PA-6/6,T, PA-6,6/6,T, PA-6,6/6/6,T and PA-6,6/6,1/6,T. Preferably PA-6, PA-6,6 and PA-4,6 are chosen. Furthermore, also polyamide blends are suitable.

Suitable thermoplastic polyesters are, for example, poly (alkylene terephthalate)s, like polybutyleneterephthalate (PBT), polytrimethyleneterephthalate (PTT), polyethyleneterephthalate (PET), polycyclohexanedimethyleneterephthalate (PCT), and poly(alkylene naphthanate)s, like polyethylenenaphthanate (PEN), and copolymers and mixtures.

Preferably the tape of the present invention comprises a polyolefin, more preferably a polyethylene and most preferably an ultra high molecular weight polyethylene.

The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene.

The tapes may be prepared in a number of ways.

A preferred method for the production of the tapes comprises feeding a polymeric powder between a combination of endless belts, compression-moulding the polymeric powder at a temperature below the melting point thereof and rolling the resultant compression-moulded polymer followed by drawing. Such a method is for instance described in U.S. Pat. No. 5,091,133, which is incorporated herein by reference. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts.

Another preferred method for the production of the tapes comprises feeding a polymer to an extruder, extruding a tape at a temperature above the melting point thereof and drawing the extruded polymer tape below its melting temperature. If desired, prior to feeding the polymer to the extruder, the polymer may be mixed with a suitable liquid organic compound, for instance to form a gel, such as is preferably the case when using ultra high molecular weight polyethylene.

In yet another preferred method the tapes are prepared by a gel process. A suitable gel spinning process is described in for example GB-A-2042414, GB-A-2051667, EP 0205960 A and WO 01/73173 A1, and in "Advanced Fibre Spinning Technology", Ed. T. Nakajima, Woodhead Publ. Ltd (1994), ISBN 185573 182 7. In short, the gel spinning process comprises preparing a solution of a polymer of high intrinsic viscosity, extruding the solution into a tape at a temperature above the dissolving temperature, cooling down the film below the gelling temperature, thereby at least partly gelling the tape, and drawing the tape before, during and/or after at least partial removal of the solvent.

In the described methods to prepare tapes, the drawing, preferably uniaxial drawing, of the produced tape may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene tapes, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes, whereby for tapes of ultra high molecular weight polyethylene, strengths of 1.5 GPa to 1.8 GPa and more may be obtained.

Yet another preferred method for the preparation of the tapes comprises mechanical fusing of unidirectional oriented fibers under a combination of pressure, temperature and time. Such a tape and a method to prepare such a tape are described in EP2205928, which is incorporated herein by reference. Preferably the unidirectional oriented fibers comprise ultra high molecular weight polyethylene (UHMWPE). UHMWPE fibres consisting of polyethylene filaments that have been prepared by a gel spinning process, such as described, for example, in GB 2042414 A or WO 01/73173 A1, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during and/or after the removal of the solvent. A UHMWPE tape prepared by mechanical fusing of fibers yields particularly good strength to weight performance of the endless shaped article The strength of the tapes largely depends on the polymer from which they are produced, on their production process, and on their, preferably uniaxial stretch ratio. The strength of a tape is preferably at least 1.2 GPa, even more preferably at least 1.5 GPa, even more preferably at least 1.8 GPa, even more preferably at least 2.1 GPa, and most preferably at least 3 GPa.

In an alternative embodiment of the invention, the strip 10 of material is a fabric or a strap made from yarns. The fabric or the strap is readily made for example by weaving or knitting yarns into any construction known in the art, e.g. a plain and/or twill weave construction for instance. Preferably, the strap is a narrow weave. The strap preferably has an n-ply webbing construction where n is preferably at most 4, more preferably at most 3 and most preferably 2.

Said strap is preferably manufactured from yarns comprising natural and/or synthetic filaments. Examples of natural materials that may be used to manufacture the filaments of the yarns include cotton, hemp, wool, silk, jute and linen. Synthetic yarns may be produced according to any technique known in the art, preferably by melt, solution or gel spinning. Examples of synthetic, also known as polymeric, materials suitable for producing the filaments of said yarns include polyamides and polyaramides, e.g. poly(p-phenylene terephthalamide) (known as Kevlar®); poly(tetrafluoroethylene) (PTFE); poly(p-phenylene-2,6-benzobisoxazole) (PBO) (known as Zylon®); liquid crystal polymers such as for example copolymers of para hydroxybenzoic acid and para hydroxynaphtalic acid 291900 (e.g. Vectran®); poly{2,6-diimidazo-[4,5b-4',5'e]pyridinylene-1,4(2,5-dihydroxy)phenylene} (known as M5); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyolefins, e.g. homopolymers and copolymers of polyethylene and polypropylene; but also polyvinyl alcohols and polyacrylonitriles. Also combinations of yarns manufactured from the above referred polymeric materials can be used for manufacturing the links.

In a preferred embodiment, the polymeric material of choice for producing said yarns is ultra high molecular weight polyethylene (UHMWPE) having an IV of preferably between 3 and 40 dl/g as determined according to ASTM D4020 at 135° C. using decalin as solvent for UHMWPE. Preferably, the UHMWPE has less than 1 side chain per 100 C atoms, more preferably less than 1 side chain per 300 C atoms as such material provides the yarns with increased mechanical properties. The advantage of an endless shaped article comprising a strip of material containing yarns manufactured from UHMWPE is that said article has in addition to an increased efficiency, also an improved abrasion resistance, strength and very importantly an increased strength to weight ratio. Therefore, the versatility of said article is improved.

The UHMWPE yarns are preferably manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "Advanced Fibre Spinning Technology", Ed. T. Nakajima, Woodhead Publ. Ltd (1994), ISBN 185573 182 7. The advantage thereof is that articles wherein gel spun UHMWPE yarns are used in the strip of material of the article, have an even further increased efficiency.

In a preferred embodiment of the invention, the strip of material comprises an UHMWPE tape and/or an UHMWPE yarn.

The invention also relates to a method for producing the endless shaped article 12 according to the invention, the method comprising the steps of
  a) providing a strip 10 of material,
  b) twisting a first length of the strip by an odd multiple of 180 degrees about its longitudinal axis to form the twist 14,
  c) forming a closed loop with said twisted first length by joining said length with the further strip, and
  d) superimposing further strip to the closed loop to provide a plurality of twisted convolutions of said strip.

In a preferred embodiment, the closed loop is formed around a pair of rotating wheels and the convolution of the strip of material is performed while the formed loop is cycling around the pair of wheels. Preferably the pair of wheels are arrange orthogonal to one another.

In one embodiment of the invention, the endless shaped article 12 is processed by winding and fusing the strip 10 of material. Such articles may be manufactured by winding a strip 10 of material for example around a pair of wheels to form an article according to the invention, heating the strip of material to a temperature below the melting point of the strip of material at which temperature the strip of material at least partly fuses, and stretching the endless shaped article by for example increasing the distance between the wheels, while simultaneously rotating the wheels. By increasing the inter-wheel distance, the strip of material is drawn. An endless shaped article according to this embodiment will comprise adjacent convolutions that are at least partly fused to one another. Such endless shaped articles have optimized strength.

Methods of Measuring

Intrinsic Viscosity (IV) is determined according to ASTM-D1601/2004 at 135° C. in decalin, the dissolution time being 16 hours, with DBPC as anti-oxidant in an amount of 2 g/l solution, by extrapolating the viscosity as measured at different concentrations to zero concentration. There are several empirical relations between IV and Mw, but such relation is highly dependent on molar mass distribution. Based on the equation $M_w=5.37*10^4 [IV]^{1.37}$ (see EP 0504954 A1) an IV of 4.5 dl/g would be equivalent to a $M_w$ of about 422 kg/mol.

Side chains in a polyethylene or UHMWPE sample is determined by FTIR on a 2 mm thick compression molded film by quantifying the absorption at 1375 $cm^{-1}$ using a calibration curve based on NMR measurements (as in e.g. EP 0 269 151)

Tensile properties, i.e. strength and modulus, of fibers were determined on multifilament yarns as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meter of fibre; values in GPa for are calculated assuming the natural density of the polymer, e.g. for UHMWPE is 0.97 $g/cm^3$.

The tensile properties of tapes and films: tensile strength and tensile modulus are defined and determined at 20° C. on tapes (if applicable obtained by slitting) of a width of 2 mm as specified in ASTM D882, using a nominal gauge length of the tape of 131 mm, a crosshead speed of 50 mm/min.

Breaking strength of the endless shaped articles is determined on dry samples using a Zwick 1484 Universal test machine at a temperature of approximately 21 degree C., and at a speed of 100 mm/min. The endless shaped articles were tested using D-shackles, the ratio between the diameter of the shackle and the thickness of the tested article connected to them was 5. The D-shackles are arranged in a parallel configuration for the comparative sling and in an orthogonal configuration for the 180 degree twisted sling.

Efficiency is determined by dividing the measured breaking strength of the endless shaped article by the product of the nominal tensile strength of the strip of material and twice the number of convolutions of the strip of material in the endless shaped article.

EXAMPLES AND COMPARATIVE EXPERIMENT

The endless shaped articles of below example and comparative experiment are constructed from a narrow weave strip comprising Dyneema® SK75, with a width and a length of 25.4 mm×1.4 mm. The strip is commercially available from Guth & Wolf (silver grey 1" weave) with a nominal breaking strength of 4 tons (39.2 kN) and a leg weight of 25 g/m.

Comparative Experiment

A length of strip was tightly convoluted to form a spiral sling with a total of 8 convolutions. The so formed spiral sling had an inner circumference of about 400 mm and an outer circumference of about 465 mm. A total of approximately 3.5 m of strip was used. The 2 ends of the sling overlapped each other on opposite sides of the thickness of the spiral sling by approximately 50 mm. The 2 ends are stitched together through the thickness of the spiral sling over the full width of the strip and a length of 40 mm by an MW stitching with Xtreme-tech 20/40 (Amann). The stitched spiral sling had a leg weight of about 200 g/m corresponding to the 8 convolutions of strip material. The theoretical breaking strength of the sling was calculated to be 627.2 kN (39.2 kN×8×2).

The breaking strength of the spiral sling was measured to be 165 kN, corresponding to an efficiency of 26.3%.

Example

A length of strip was tightly convoluted to form a 0-shape sling bearing a 180 degree twist in each convolution of the strip. A total of 8 convolutions were performed with approximately 3.5 m of the strip. The so formed 180 degree twisted sling had approximate circumferences of 400 mm (inner) and 465 mm (outer). The 2 ends of the sling overlapped by approximately 50 mm and are stitched together through the thickness of the 180 degrees twisted sling over a length of 40 mm with an MW stitching with Xtreme-tech 20/40 (Amann). The twisted sling had a leg weight of about 200 g/m corresponding to the 8 convolutions of strip material. The theoretical strength of the sling was calculated to be 627.2 kN.

The breaking strength of the sling was measured to be 225 kN, corresponding to an efficiency of 35.9%.

The invention claimed is:

1. An endless shaped article comprising:
a single strip of material having opposing ends comprised of a woven fabric of ultrahigh molecular weight polyethylene (UHMWPE) yarn, wherein the strip of material has a longitudinal axis and forming at least four convolutions of the strip of material, wherein
each of the at least four convolutions comprises a twist along the longitudinal axis of the strip of material which is an odd multiple of 180 degrees, and wherein
each of the at least four convolutions of the strip of material is a length of the strip of material starting at an arbitrary plane perpendicular to the longitudinal axis of the strip of material and ending in an endless fashion at the same arbitrary plane, and wherein
the strip of material is coiled into at least four overlapping layers that are substantially superimposed upon one another such that the opposing ends of the strip of material are overlapped along a first portion of the length of the strip of material in each of the at least four convolutions, and wherein
a difference in length between two adjacent ones of the at least four convolutions of the strip of material is less than 6 times a thickness of the strip of material, and wherein the overlapped opposing ends are connected to one another by stitches extending through a thickness of the at least four overlapping layers in the first portion of the length of the strip of material in each of the at least four convolutions so as to connect the overlapped opposing ends one to another while the at least four overlapping layers in at least a part of a remaining second portion of the length of the strip of material in each of the at least four convolutions are unconnected to one another.

2. The endless shaped article of claim 1, wherein a length of each of the at least four convolutions differs from an average length of all of the at least four convolutions by less than 6 times the thickness of the strip of material.

3. The endless shaped article of claim 1, wherein the article has a density which is at least 70% of a density of the strip of material.

4. The endless shaped article of claim 1, wherein the article is selected from the group consisting of slings, loops, belts and chain links.

5. The endless shaped article of claim 1, wherein strip of material is a plain and/or twill weave construction.

6. The endless shaped article of claim 1, wherein adjacent ones of the at least four convolutions are at least partly fused to one another.

7. The endless shaped article of claim 1, wherein a difference in length between two adjacent ones of the at least four convolutions of the strip of material is less than 2 times the thickness of the strip of material.

8. The endless shaped article of claim 1, wherein the strip of material has at least eight convolutions.

9. The endless shaped article of claim 1, wherein a length of each of the at least four convolutions differs from an average length of all of the at least four convolutions by less than 4 times the thickness of the strip of material.

10. The endless shaped article of claim 1, wherein a length of each of the at least four convolutions differs from an average length of all of the at least four convolutions by less than 2 times the thickness of the strip of material.

11. The endless shaped article of claim 1, wherein a difference in length between two adjacent ones of the at least four convolutions of the strip of material is less than 4 times a thickness of the strip of material.

12. The endless shaped article of claim 1, wherein the article forms an O-shape sling bearing a 180 degree twist in each of the at least four convolutions of the strip of material.

13. The endless shaped article of claim 1, wherein the strip of material has a ratio of width to thickness of at least 5:1.

14. The endless shaped article of claim 1, wherein the strip of material has a ratio of width to thickness of at least 10:1.

15. The endless shaped article of claim 1, wherein the strip of material has a thickness of between 20 microns and 5 mm.

16. The endless shaped article of claim 1, wherein the UHMWPE has an Intrinsic Viscosity (IV) of between 3 and 40 dl/g as determined according to ASTM D4020 at 135° C. using decalin as solvent for the UHMWPE.

17. The endless shaped article of claim 1, wherein the strip is a strap having an n-ply webbing construction, wherein n is at most 4.

18. A method for making an endless shaped article according to claim 1, wherein the method comprises the steps of:
a) providing the strip of material having the opposing ends,
b) twisting a first length of the strip by an odd multiple of 180 degrees about a longitudinal axis thereof, c) forming a closed loop with the twisted first length by joining the first length with a further length of the strip of material, d) superimposing the further length of the strip onto the closed loop to provide at least four twisted convolutions of the strip of material with the opposing ends overlapping, and e) connecting the overlapping opposing ends with stitching.

19. The method according to claim 18, wherein step e) comprises stitching the overlapped opposing ends to one another.

20. The method according to claim 18, wherein step d) is performed such that a difference in length between two adjacent convolutions of the strip of material is less than 6 times a thickness of the strip.

21. The method according to claim 18, wherein step d) is performed such that a difference in length between two adjacent convolutions of the strip of material is less than 4 times a thickness of the strip.

22. The method according to claim 18, wherein step d) is performed such that a difference in length between two adjacent convolutions of the strip of material is less than 2 times a thickness of the strip.

23. The method according to claim 18, wherein step d) is performed such that the strip of material has at least eight convolutions.

24. The method according to claim 18, wherein the article is selected from the group consisting of slings, loops, belts or chain links.

25. A chain comprising a chain element, wherein the chain element comprises the endless shaped article according to claim 1.

26. The chain according to claim 25, wherein the chain is a synthetic chain.

* * * * *